Nov. 14, 1950 — E. H. BREAUX — 2,530,223
OIL WELL FILTER
Filed Oct. 1, 1947
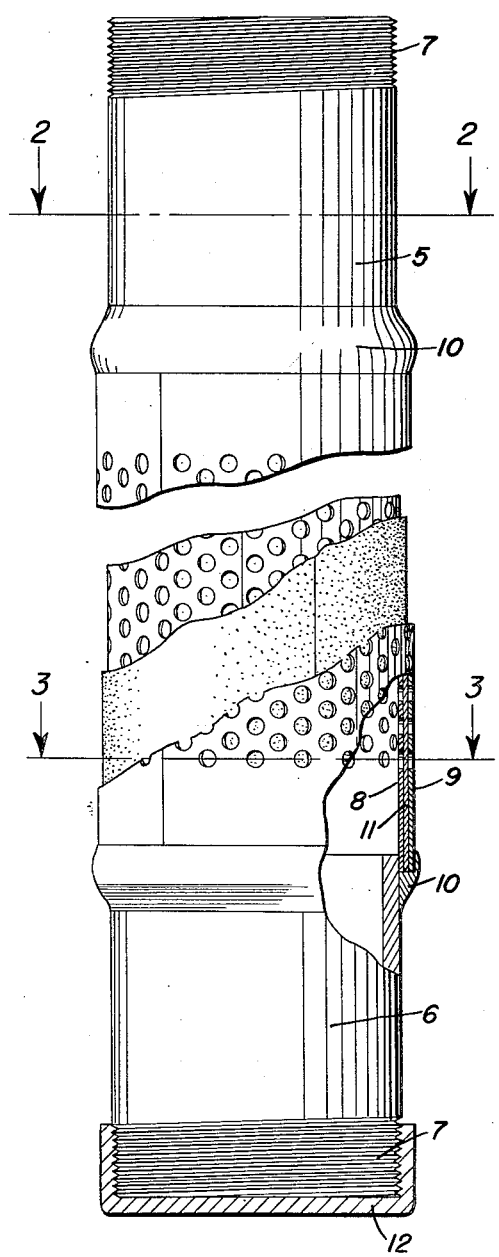
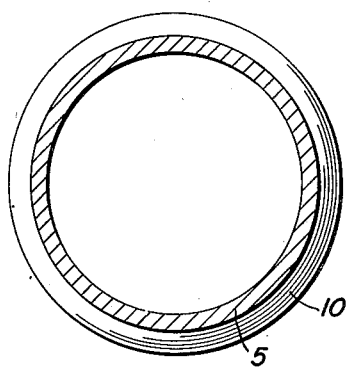
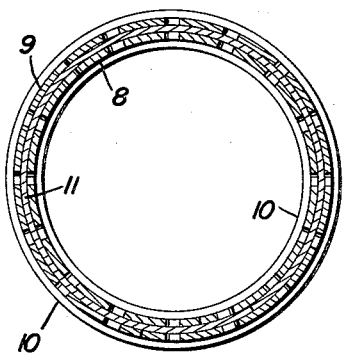
Inventor
Elton H. Breaux Patented Nov. 14, 1950

2,530,223

UNITED STATES PATENT OFFICE 2,530,223

OIL WELL FILTER

Elton H. Breaux, Rayne, La.

Application October 1, 1947, Serial No. 777,235

1 Claim. (Cl. 166—7)

The present invention relates to new and useful improvements in filters and more particularly to a filter for an oil well casing.

An important object of the invention is to provide a filter of this character which is adapted for connecting to an oil well casing and embodying filtering elements to admit the passage of oil into the casing and to effectively exclude the entrance of sand and water into the casing.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view with parts broken away and shown in section, and Figures 2 and 3 are transverse sectional views taken respectively on the lines 2—2 and 3—3 of Figure 1.

Referring now to the drawings in detail wherein for the purpose of illustration I have disclosed a preferred embodiment of the invention the numerals 5 and 6 designate upper and lower pipe sections which are smooth at one end and threaded at their opposite ends as shown at 7.

Inner and outer cylindrical metal perforated or foraminous filtering members 8 and 9 have their ends telescoped over the smooth ends of the pipe sections and secured thereto by welding, as shown at 10 or by other permanent attaching means. A sheet of chamois skin 11 is positioned between the filtering members 8 and 9 to provide an intermediate cylindrical filtering element. The inner and outer filtering members 8 and 9 may be constructed of any suitable material, such as screening, or may be rigid perforated metal tubing, if desired.

In the operation of the device, the threaded end 7 of the pipe section 5 is connected in a well casing to be lowered in the well therewith and the lower end of pipe section 6 is closed by a cap 12 or other suitable means. The chamois skin filtering element 11 is supported against collapsing by the inner and outer filtering members 8 and 9 and oil is permitted to pass through the filtering element 11 into the casing while sand and other solid substances are excluded as well as a large percentage of water contained in the well.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention what is claimed as new is:

A filter for oil well casings comprising inner and outer perforated tubes, a chamois skin filler between the tubes, and means securing the assembled tubes and filler to a casing, said means comprising upper and lower pipe sections welded to the opposite ends of the tubes, said upper pipe section being secured to the lower end of a casing and the lower pipe section being closed at its lower end.

ELTON H. BREAUX.

REFERENCES CITED

The following references are of record in the file of this patent:

UNITED STATES PATENTS

| Number | Name | Date |
|---|---|---|
| 560,399 | Durbrow | May 19, 1896 |
| 746,378 | Redfield | Dec. 8, 1903 |
| 921,337 | Archer | May 11, 1909 |
| 997,191 | Hogarth | July 4, 1911 |
| 1,341,755 | Minton | June 1, 1920 |
| 1,535,768 | Davis | Apr. 28, 1925 |
| 1,584,743 | Hensley | May 18, 1926 |
| 1,621,725 | Hills | Mar. 22, 1927 |
| 2,167,191 | Vietti et al. | July 25, 1939 |

FOREIGN PATENTS

| Number | Country | Date |
|---|---|---|
| 699 | Great Britain | A. D. 1868 |